United States Patent [19]

Ankenman

[11] 4,330,041
[45] May 18, 1982

[54] SCRAPER ASSEMBLY

[75] Inventor: Thomas W. Ankenman, Hutchinson, Kans.

[73] Assignee: Krause Plow Corporation, Hutchinson, Kans.

[21] Appl. No.: 173,050

[22] Filed: Jul. 28, 1980

[51] Int. Cl.³ .............................................. A01B 23/06
[52] U.S. Cl. ..................................... 172/566; 172/753
[58] Field of Search ............... 172/565, 566, 573, 710, 172/610, 753, 509, 561, 558, 560, 562, 563, 564; 280/158 R, 158 A, 158.1

[56] References Cited

U.S. PATENT DOCUMENTS

| 423,523 | 3/1890 | Little . | |
|---|---|---|---|
| 663,436 | 12/1900 | Heylman . | |
| 718,825 | 1/1903 | Davis . | |
| 718,885 | 1/1903 | Stephenson | 172/561 X |
| 756,107 | 3/1904 | Fetzer | 172/566 |
| 793,715 | 7/1905 | Deere . | |
| 816,663 | 4/1906 | Jobling . | |
| 828,183 | 8/1906 | Brennan | 172/566 |
| 832,938 | 10/1906 | Waterman . | |
| 1,017,109 | 2/1912 | Rieske | 172/566 |
| 1,248,953 | 12/1917 | Treadwell | 172/566 |
| 1,534,489 | 4/1925 | Barnes . | |
| 2,775,181 | 12/1956 | Zahn | 172/710 |
| 3,045,765 | 7/1962 | Cox . | |
| 3,833,067 | 9/1974 | Peterson | 172/566 |
| 4,008,770 | 2/1977 | Boone | 172/566 |
| 4,113,030 | 9/1978 | Walker | 172/566 |

FOREIGN PATENT DOCUMENTS 5076 of 1926 Australia ....................... 280/158 R Primary Examiner—Richard J. Johnson
Attorney, Agent, or Firm—Schmidt, Johnson, Hovey & Williams

[57] ABSTRACT

For use with farm implements having tillage discs, there is provided a disc scraping assembly in which the swingable arm for supporting the scraper blade is provided with a hat section mount together with a compression spring to yieldably hold the blade against the disc. Alternate connections are provided between the arm and the tension means such as to selectively permit use of the assembly in connection with either of a pair of discs depending upon which direction the concave surface of the disc is facing in the implement. The blade is rotatably mounted on the arm through use of a dirt clearance slot which, in turn, releasably receives a pair of yokes freely rotatable on the arm and releasably interlocked with the blade. Removable cross pins in the arm cooperate with the yokes in preventing displacement of the scraper blade axially of the arm.

5 Claims, 6 Drawing Figures

U.S. Patent    May 18, 1982    Sheet 1 of 2    4,330,041
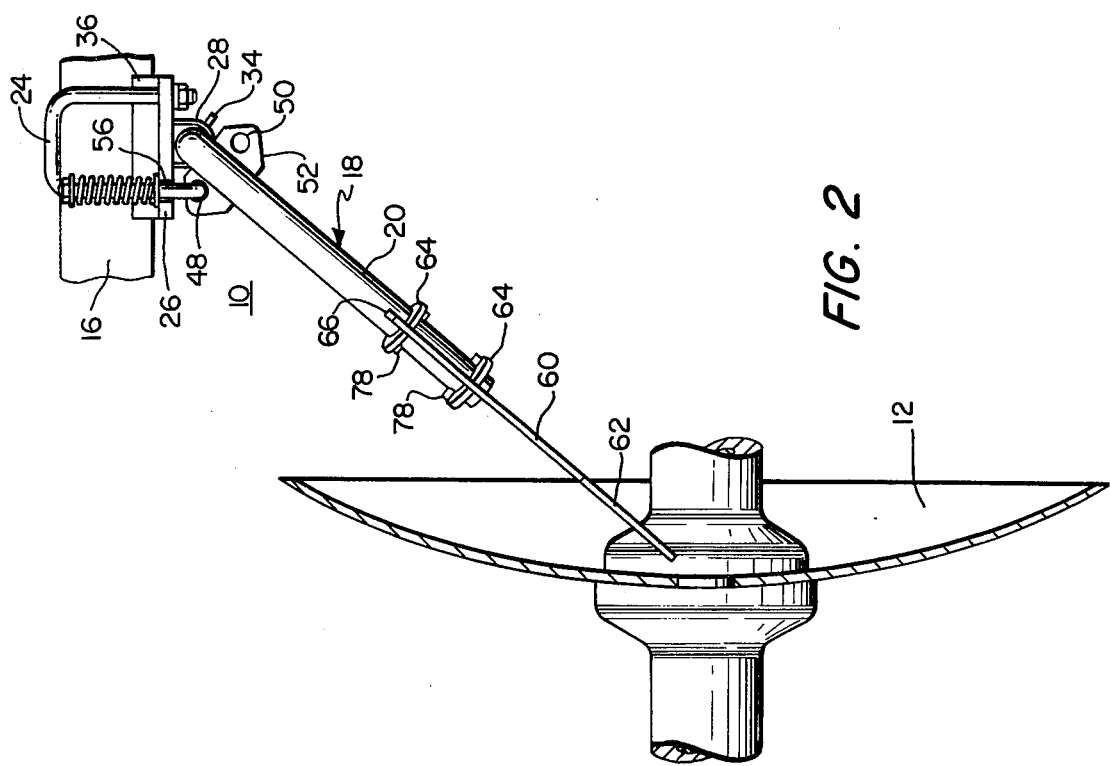
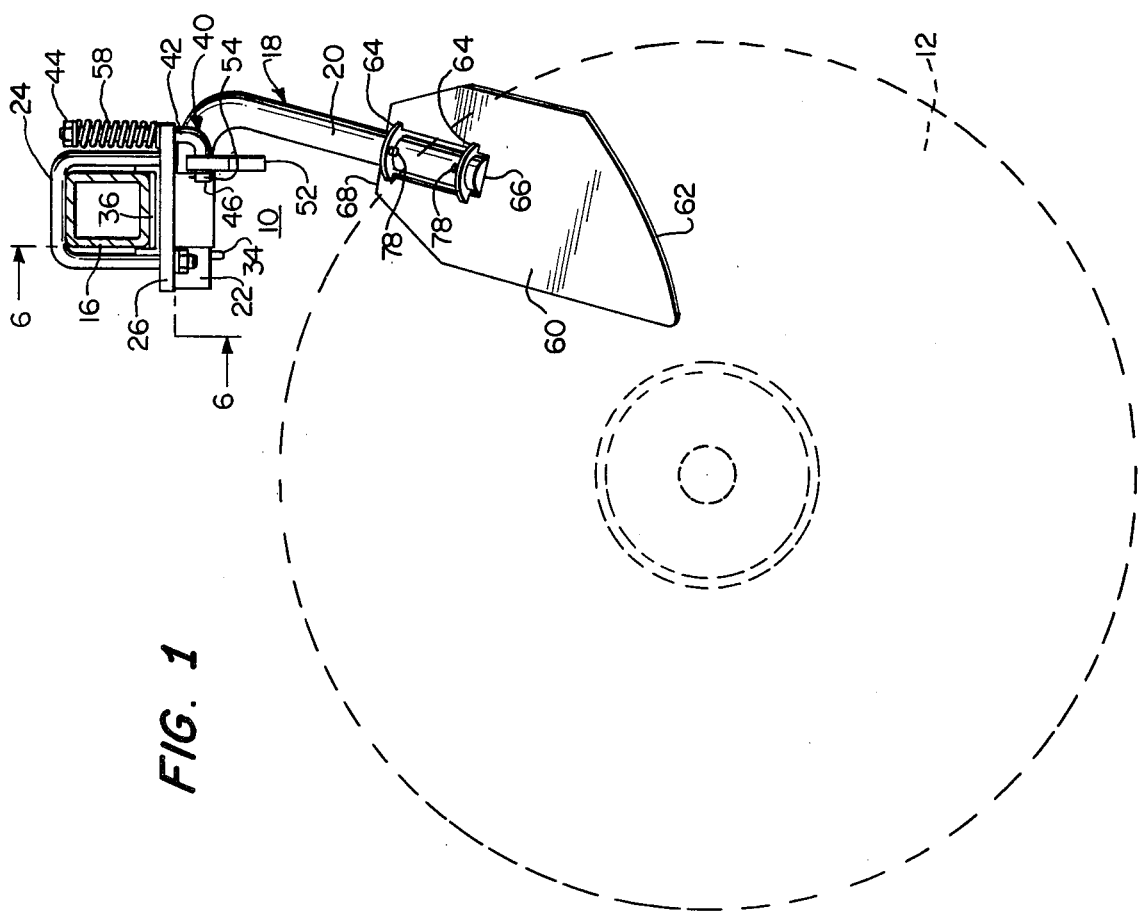

SCRAPER ASSEMBLY

Multitudes of suggestions have been made for the scraping of tillage discs to maintain them free of dirt buildup, including not only spring bias means to yieldably hold the scraper blade against the disc, but attachments of the blades themselves to their supporting arms or shanks in a manner to provide proper engagement with the contour of the discs at all times regardless of imperfection in their particular concave configuration.

The prior U.S. patent art known to me and believed to be most relevant includes U.S. Pat. Nos. 756,107 and 1,248,953 relating to the spring means for yieldably biasing the scraper blade against the disc, as well as the spring arrangement of No. 4,008,770; the suggestions of Nos. 828,183 and 3,833,067 for rotatably mounting the scraper blade on its supporting arm; and the way in which there is provided in No. 4,113,030 a construction which permits the scraper blade to engage either of two tillage discs.

As distinguished from prior disclosures with which I am aware, I utilize a compression spring in conjunction with a tension bolt in such manner as to improve upon the desired results of maintaining the scraper blade yieldably biased against the disc. Such spring and tension bolt arrangement is such, through use of a bracket on the arm as to permit positioning of the arm in either of two inclined positions depending from the overlying support.

Associated with the spring arrangement is a hat section type of bearing support for the swingable arm which is especially inexpensive and easily assembled.

Still further, the blade is mounted for oscillation on the arm by use of a slot in the blade which will clear it of debris that what would otherwise hinder free oscillation. To this end, I employ a pair of special yokes interlocked with the blade in the slot and rotatable on the arm. Roll pins traverse the arm to hold the yokes properly in place axially of the arm.

In the drawings:

FIG. 1 is a vertical cross sectional view through an implement beam showing a scraper blade assembly mounted thereon and made in accordance with my present invention all in proper relationship to a disc to be scraped illustrated in phantom;

FIG. 2 is a fragmentary elevational view of the scraper assembly taken substantially at right angles to FIG. 1, the disc being illustrated in vertical cross section;

Figure 3:
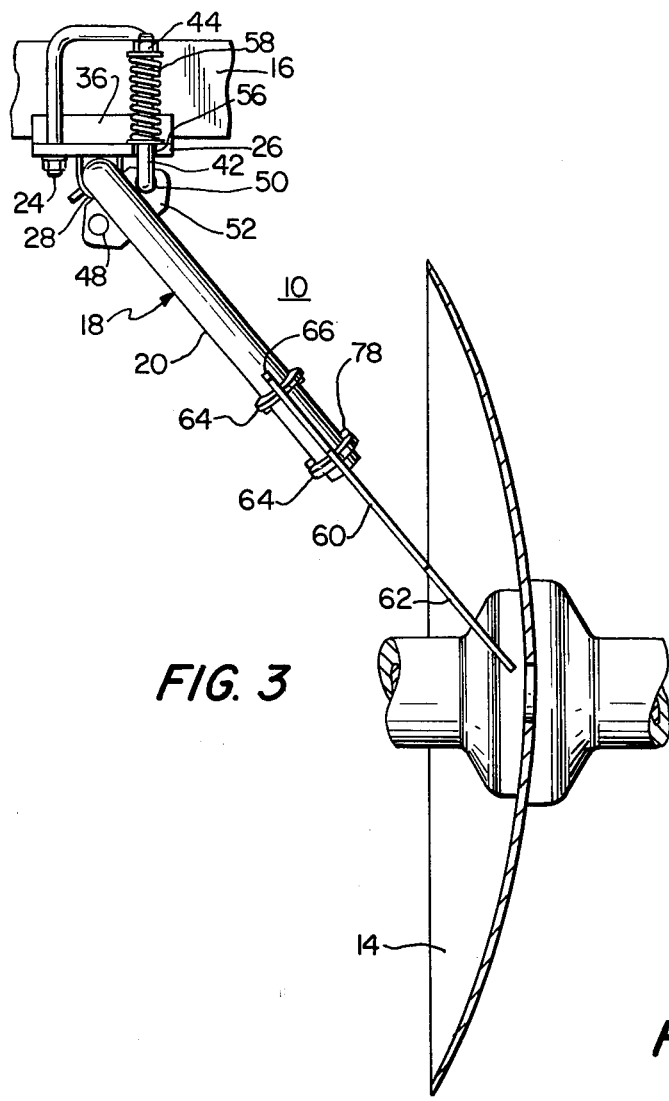
FIG. 3 is a view similar to FIG. 2 but showing the opposite inclination of the blade supporting arm.

A scraper assembly 10 for farm implements that are provided with tillage discs 12 and 14, is shown in the drawing carried by a suitable support 16 in the nature of a cross beam forming a part of the implement.

The assembly 10 includes an L-shaped scraper mount 18 provided with an elongated arm 20 which slopes downwardly at an angle from the support 16 toward the disc 12 in FIGS. 1 and 2, there being a lateral extension 22 integral with the upper end of the arm 20.

A U-bolt 24 is looped over the beam 16 and clamped to the latter through use of a cooperating plate 26 underlying the beam 16.

Figure 6:
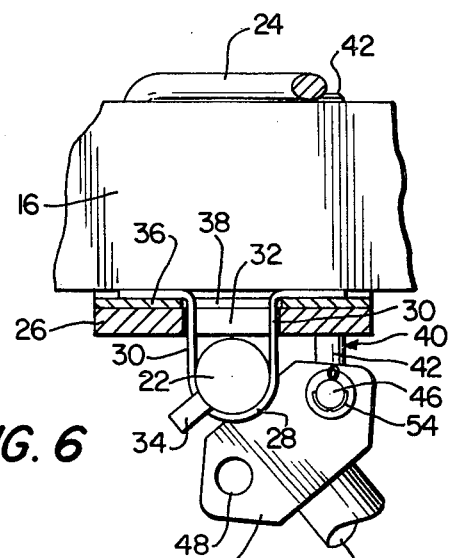
FIG. 6 is a fragmentary cross sectional view taken on line 6—6 of FIG. 1.

Bearing means for the extension 22 includes a hat section that is provided with a loop 28 terminating in a pair of L-shaped members 30 which extend through a rectangular opening 32 in the plate 26, the members 30 overlapping the plate 26 as best seen in FIG. 6. A radial roll pin 34 through the extension 22 and a bracket 52 rigid to the extension 22 preclude axial displacement of the extension 22 with respect to the loop 28. The horizontal portions of the members 30 are confined within a channel guide 36 resting on the plate 26, embracing the beam 16 and having a clearance aperture 38 for the members 30.

Tension means pivotally coupled with the arm 20 includes an L-shaped bolt 40 having an upright externally threaded leg 42 which receives an adjusting nut 44, and a lateral leg 46 received in either of two openings 48 and 50 within the bracket 52. A cotter pin 54 through the leg 46 completes the attachment of the bolt 40 to the bracket 52. The upright leg 42 is cleared by a recess 56 in the plate 26, and a compression spring 58, coiled about the leg 46, is interposed between the plate 26 and the nut 44.

A scraper blade 60, provided with an arcuate edge 62 engagable with the concave face of the disc 12, is releasably mounted on the lower end of the arm 20 through use of a yoke means in the nature of ellipitcal, platelike wings 64 interlocked with the blade 60 and spaced axially of the arm 20 within a slot 66 that extends inwardly from the upper end 68 of the blade 60.

Figure 5:
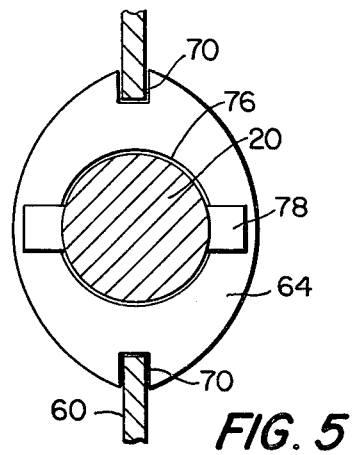
FIG. 5 is a cross sectional view taken on line 5—5 on FIG. 4.
Figure 4:
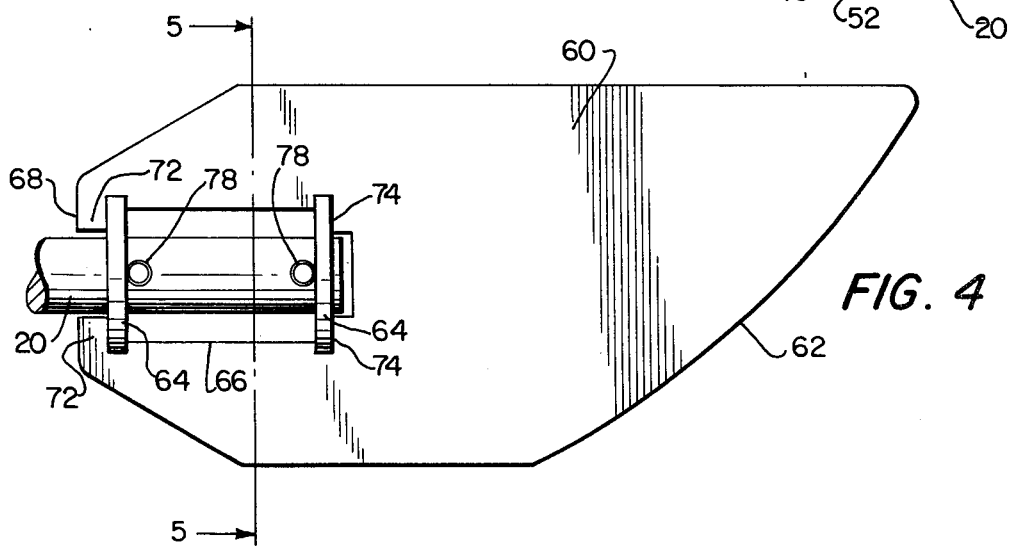
FIG. 4 is an enlarged elevational view of the scraper blade illustrating with more particularity its attachment to the arm.

Each wing 64 has a pair of notches 70 in opposed relationship at its major axis which receive the blade 60 as is clear in FIGS. 4 and 5. Ears 72 at the outer end of the slot 66 and shoulders 74 at the inner end of the slot 66 provide additional support for the wings 64. The arm 20 extends through center holes 76 in the wings 64, and a pair of removable roll pins 78 through the arm 20 between the wings 64 engage the latter to preclude axial displacement of the arm 20 with respect to the wings 64.

OPERATION

Assuming the component parts of the scraper assembly 10 to be positioned as shown in FIGS. 1, 2 and 6 of the drawings, the edge 62 of the blade 60 is held yieldably biased against the concave face of the rotating disc 14 by the action of the spring 58 tending to lift the leg 42 of the bolt 40 as cleared by the recess 56 in the plate 26. Such action on the part of the compression spring 58 is imparted to the bracket 52, thereby tending to rotate the extension 22 in a clockwise direction (viewing FIG. 2) within the bearing loop 28.

At the same time, the blade 60 is free to oscillate about the axis of the arm 20 such as to conform to the concave configuration of the disc 12 and such as to permit passage of material between the edge 62 and the disc 12 which might be of such nature as to otherwise result in damage to the scraper assembly 10. It is significant also that dirt will readily pass through the slot 66 such as to preclude buildup which would adversely affect free oscillation of the blade 60 with respect to the arm 20. The fact that the axis of oscillation of the blade 60 is coincident with the longitudinal axis of the arm 20 precludes binding and contributes to the ease of oscillation.

The blade 60 is easily and quickly mounted on and removed from the arm 20. It is but necessary to remove pins 78 such as to release the arm 20 from the wings 64, whereupon the latter may be simply turned within the slot 66 to release their interlock at the notches 70 with the blade 60.

The interconnection between the assembly 10 and the support beam 16 may also be readily released simply by removing the U-bolt 24, thereby releasing the plate 26, the bolt 40 and the guide 36. The operation above described is the same when the blade 60 is to be used in conjunction with the disc 14. To that end, it is but necessary to remove the cotter pin 54, remove the leg 46 from within the opening 48, reversing the plate 26 and effecting a connection between the bolt 40 and the bracket 52 through use of the hole 50, all as is quite clear by comparing FIGS. 2 and 3 of the drawings.

I claim:

1. A scraper assembly for a tillage disc comprising:
   a support;
   an L-shaped scraper mount having an elongated arm sloping downwardly at an angle from the support toward the disc to be scraped, and a lateral extension at the upper end of the arm;
   a scraper blade mounted on the arm at its lowermost end;
   bearing means mounted on the support and rotatably receiving said extension for swinging movement of the arm toward and away from said disc;
   spring tension adjusting means having an upstanding portion pivotally coupled at its lower end with said arm;
   a compression spring coiled about said tension means and resting at its lower end on the support for yieldably biasing the blade against the disc; and
   a bracket secured to the extension, said portion being pivotally coupled with the bracket,
   said tension means including an L-shaped bolt having an upright spring-receiving leg, presenting said portion, and a lateral bracket-receiving leg.

2. The invention of claim 1, said support including a beam having a fastener provided with a plate clamped thereto, said upright leg extending through the plate, said spring resting on the plate thereabove.

3. The invention of claim 1, said support including a beam having a fastener provided with a plate clamped thereto, said bearing means depending from the plate and receiving the extension beneath the support.

4. The invention of claim 3, said bearing means having a loop beneath the plate rotatably receiving said lateral extension, the loop terminating in a pair of L-shaped members extending through the plate and overlapping the latter.

5. A scraper assembly for a tillage disc comprising:
   a support;
   an arm mounted on the support;
   a disc-scraping blade;
   means attaching the blade to the arm including: yoke means releasably interlocked with the blade and rotatably receiving the arm,
   said blade having a slot extending into one end of the blade and receiving the yoke means, said arm extending into the slot and through the yoke means,
   said yoke means including a pair of spaced wings traversing the slot and the arm, and
   a pair of pins traversing the arm, said pins and said wings being in interengagement for retaining the wings against axial displacement along the arm.

* * * * *